United States Patent [19]

Iwasawa et al.

[11] Patent Number: 4,829,325

[45] Date of Patent: May 9, 1989

[54] INK JET RECORDING APPARATUS WITH AN ELECTRODE DISPOSED AT WRITING PAPER SIDE

[75] Inventors: Toshiyuki Iwasawa, Tokyo; Masayoshi Miura, Kawasaki, both of Japan

[73] Assignee: Matsushita Electric Industrial Co., Ltd., Osaka, Japan

[21] Appl. No.: 117,852

[22] Filed: Nov. 6, 1987

[30] Foreign Application Priority Data

Nov. 14, 1986 [JP] Japan ................................ 61-272476

[51] Int. Cl.$^4$ .............................................. G01D 15/16
[52] U.S. Cl. ................................................. 346/140 R
[58] Field of Search .................................. 346/140, 75

[56] References Cited

U.S. PATENT DOCUMENTS

| | | | |
|---|---|---|---|
| 3,673,601 | 6/1972 | Hertz | 346/75 |
| 3,981,020 | 9/1976 | Takano | 346/75 |
| 4,223,322 | 9/1980 | Raamsdonk | 346/140 |
| 4,403,234 | 9/1983 | Miura | 346/140 |
| 4,595,938 | 6/1986 | Conta | 346/140 |
| 4,668,959 | 5/1987 | Jochimsen | 346/75 X |

*Primary Examiner*—Joseph W. Hartary
*Attorney, Agent, or Firm*—Pollock, VandeSande & Priddy

[57] ABSTRACT

An ink jet recording apparatus with an ink jet printing head is disclosed. The ink jet printing head has first and second electrodes for ejecting ink toward writing paper by means of an electric field established between the first and second electrodes, the first electrode being disposed in opposed relation to the writing paper. The writing paper is placed on a cylindrical drum which is provided so as to be in opposed relation to the ink jet printing head and moved with respect to the ink jet printing head. Also included in the ink jet recording apparatus is a third electrode which is provided on the outer surface of the cylindrical drum in opposed relation to the ink jet printing head. The third electrode is controlled so that the potential thereof is equal to or higher than that of the ink jet printing head.

8 Claims, 5 Drawing Sheets

INK JET RECORDING APPARATUS WITH AN ELECTRODE DISPOSED AT WRITING PAPER SIDE

BACKGROUND OF THE INVENTION

The present invention relates generally to an ink jet recording apparatus of the type where printing ink is ejected from an ink jet printing head toward a writing surface by means of an electric field established between electrodes.

Known is an ink jet recording apparatus with an ink jet printing head of the type, as described in U.S. Pat. No. 4,403,234 and illustrated in FIG. 1 of the present application, comprising a surface electrode 102 attached to the front surface of the ink jet printing head 101 and a control electrode 104 placed in an ink chamber 103. The surface electrode 102 and the control electrode 104 are provided for establishing an electric field therebetween to cause ink in an ink nozzle 112 coupled to the ink chamber 103 to extend toward an air-ink nozzle 110 so as to form a meniscus 113. In response to application of a control voltage $V_S$ (corresponding to a recording signal) in addition to a bias voltage $V_B$, the ink meniscus 113 is pulled off and the resultant ink droplet is carried by airstream supplied from an air supply passage 107 through an air chamber 111 and ejected through the air-ink nozzle 110 and the ejected ink droplet is attached as illustrated at 106 to a recording sheet 105. The surface electrode 102 is positively charged and the carried ink droplet is negatively charged, and thus the recording sheet 105 is charged negatively. As a result of this charging relation, particles 109 such as dust and coating materials attached to the recording sheet 105 are drawn and attached to the surface electrode 102. The particles would cause disadvantages of ink ejection such as clogging of the ink nozzle 110 and flight curvature of the ejected ink droplet, resulting in deterioration of the recording characteristics of the apparatus.

SUMMARY OF THE INVENTION

The present invention has been developed in order to eliminate this problem inherent to the prior recording apparatus, and it is an object of the present invention to provide a new and improved ink jet recording apparatus which is capable of preventing the transfer of the particles to the surface electrode of the ink jet printing head and hence preventing the deterioration of the recording characteristics.

A feature of the present invention involves providing an electrode at a writing paper side so that the electric potential of the writing paper side is equal to or higher than that of an ink jet printing head side. An ink jet recording apparatus according to the present invention has an ink jet printing head comprising first and second electrodes for ejecting ink toward writing paper by means of an electric field established between the first and second electrodes. The writing paper is placed on a cylindrical drum which is provided so as to be in opposed relation to the ink jet printing head and moved with respect thereto. Also included in the ink jet recording apparatus is a third electrode which is provided on the outer surface of the cylindrical drum in opposed relation to the ink jet printing head. The third electrode is controlled so that the potential thereof is equal to or higher than that of the ink jet printing head. This prevents particles on the writing paper from being transferred to the ink jet printing head.

Another feature of the present invention involves a pair of electrodes in the vicinity of a writing paper whereby the potential at the writing paper side becomes partially higher than that of the ink jet printing head side. An ink jet recording apparatus has an ink jet printing head comprising first and second electrodes for ejecting ink toward writing paper by means of an electric field established between the first and second electrodes. The ink jet printing head is movable in the transversal direction of the writing paper in opposed relation thereto. At the positions corresponding to out of the writing position range of the ink jet printing head are provided third and fourth electrodes, the potential values of which are higher than that of the ink jet printing head. Preferably, one of the third and fourth electrodes is energized when being in the opposed relation to the ink jet printing head so that the potential thereof is higher than that of the ink jet printing head. This causes removal of particles from the ink jet printing head.

BRIEF DESCRIPTION OF THE DRAWINGS

The present invention will be described in further detail with reference to the accompanying drawings, in which.

DETAILED DESCRIPTION OF THE INVENTION

Figure 1:
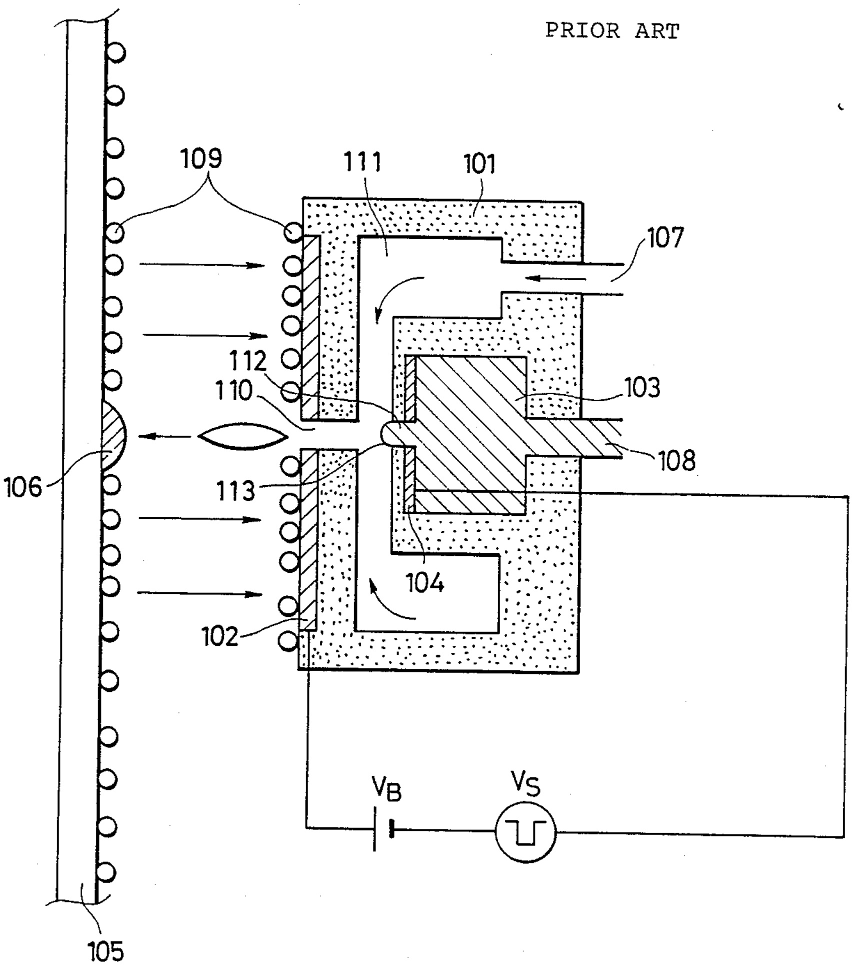
FIG. 1 PRIOR ART
FIG. 1 is a cross sectional view showing one example of ink jet printing heads of the prior recording apparatus.
Figure 2:
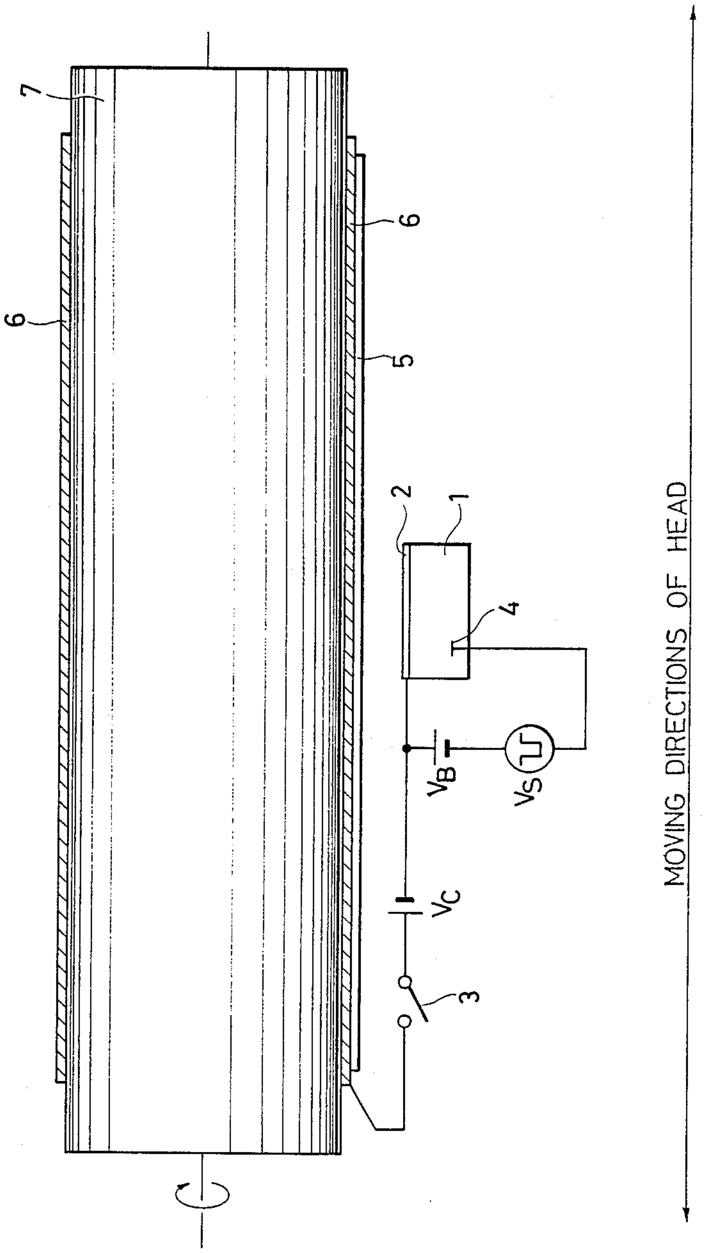
FIG. 2 is a top view schematically showing an ink jet recording apparatus according to a first embodiment of the present invention.
Figure 3:
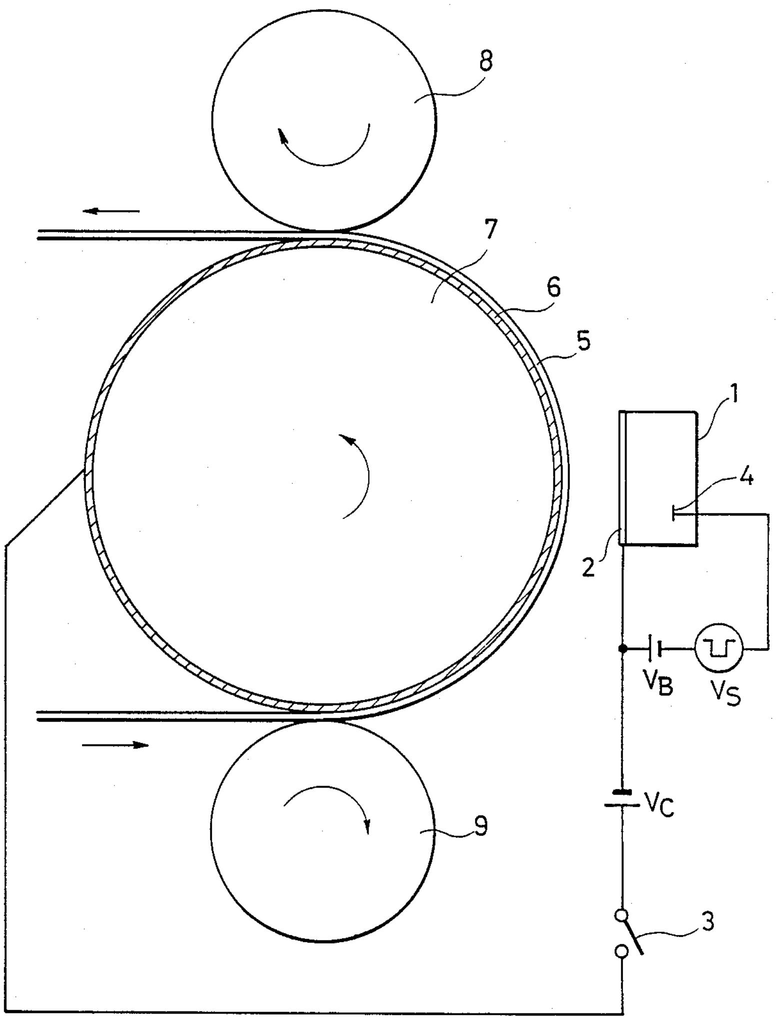
FIG. 3 is a side view illustrating the FIG. 2 ink jet recording apparatus.

Referring now to FIGS. 2 and 3, there is schematically illustrated an ink jet recording apparatus according to an embodiment of the present invention. In FIGS. 2 and 3, the ink jet recording apparatus has an ink jet print head 1 with an arrangement substantially similar to the ink jet printing head 101 of FIG. 1, which comprises a surface electrode 2 and a control electrode 4 between which a bias voltage $V_B$ and a control voltage $V_S$ are applied to cause ink to be ejected toward writing paper 5 placed on a cylindrical drum 7. A detailed description of the ink jet printing head will be omitted for brevity, because its arrangement is similar to the FIG. 1 ink jet printing head. On at least a portion of the outer surface of the cylindrical drum 7 is provided a suppression electrode 6 made of a conductive material. The suppression electrode 6 is wrapped around the outer surface of the cylindrical drum 7 for the purpose of uniforming the potential at the back surface of the writing paper 5. The suppression electrode 6 is coupled through a switching device 3 to a suppression voltage source Vc which is in turn connected to the surface electrode 2 of the ink jet printing head 1 so that the potential of the suppression electrode 6 is equal to or higher than that of the surface electrode 2. The switching device 3 is arranged so as to be closed when the ink jet printing head 1 faces the writing paper 5, which is delivered between the drum 7 and first and second rollers 8 and 9.

In operation, under the condition that the ink jet printing head 1 does not face the writing paper 5, that is, when the ink jet printing head 1 is out of the writing position range, the bias voltage $V_B$ is applied between the surface electrode 2 and the control electrode 4 and the switching device 3 is set to the opened state. The control of the switching device 3 may be performed in accordance with a signal indicative of the position of the ink jet printing head 1, for example, as described in U.S. Pat. No. 4,223,324. Here, although the surface electrode 2 is charged positively, since the surface electrode 2 does not face the writing paper 5, particles on the writing paper 5 are not drawn thereto. On the other hand, in response to turning of the surface electrode 2 toward the writing paper 5, i.e., the transfer of the ink jet printing head into the writing position range, the switching device 3 is set to the closed state so that a suppression voltage Vc is applied to the suppression electrode 6 which in turn takes a potential equal to or higher than that of the surface electrode 2. This causes a potential difference corresponding to the suppression voltage Vc between the writing paper 5 and the ink jet printing head 1, so that the potential at the writing paper 5 becomes equal to or higher than that of the surface electrode 2, resulting in preventing the transfer of the particles to the surface electrode 2. Here, if the drum 7 is made of a metal, it is also appropriate that the drum 7 per se is used as a suppression electrode. The suppression voltage Vc is about 0 to 500 volts, preferably, and if it is extremely high, the ink droplet may be ejected toward the writing paper 5 irrespective of application of the control voltage $V_S$.

Figure 4:
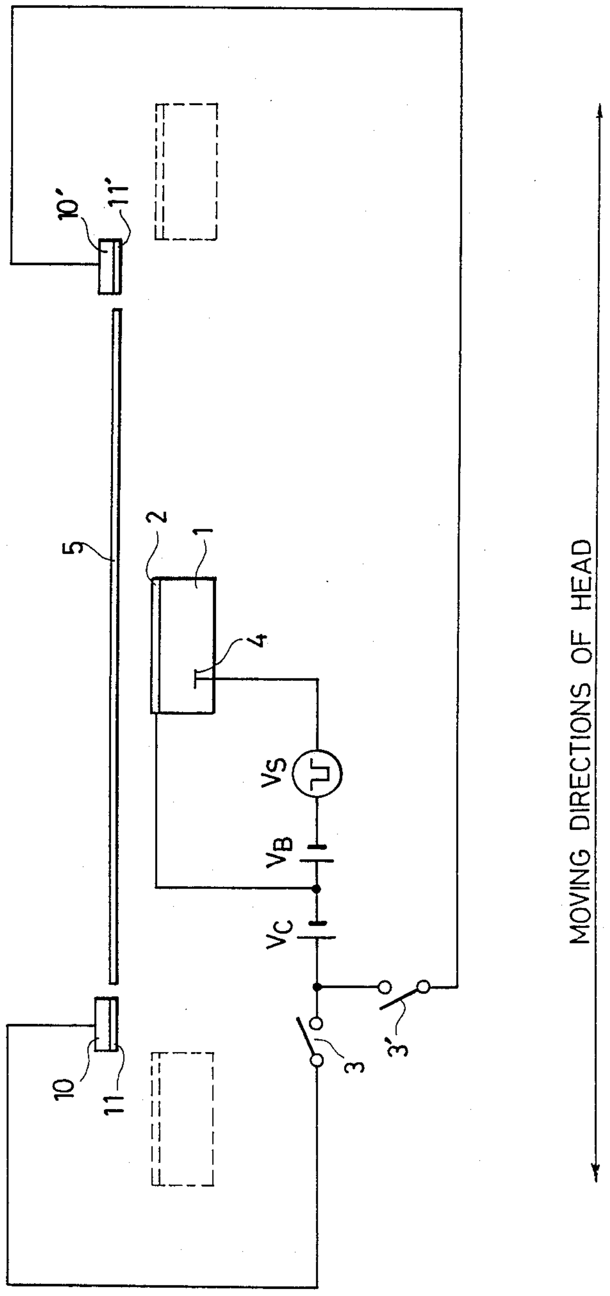
FIG. 4 is a top view schematically illustrating an ink jet recording apparatus according to a second embodiment of the present invention.
Figure 5:
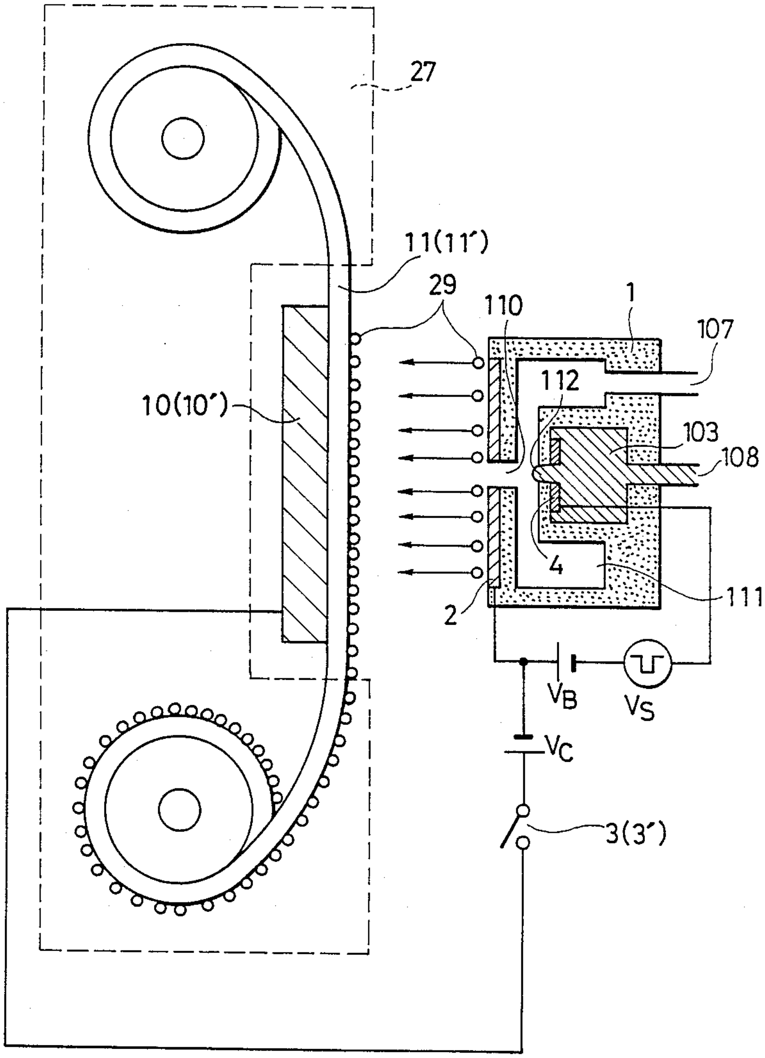
FIG. 5 is a side cross-sectional view of the FIG. 4 ink jet recording apparatus.

FIG. 4 illustrates a plan-scanning type ink jet recording apparatus according to another embodiment of the present invention. In FIG. 4, an ink jet printing head 1 is arranged to be reciprocated in the right and left directions in the figure and, as illustrated in FIG. 5, similarly comprises a surface electrode 2 and a control electrode 4 between which a bias voltage $V_B$ is applied normally and a control voltage $V_S$ is additionally applied in superimposing relation to the bias voltage $V_B$ for ejecting of ink to a writing paper 5, which is moved by a predetermined distance at every one scanning of the ink jet printing head 1. In the vicinity of both the end portions of the writing paper 5, i.e., at positions corresponding to out of the recording position range of the ink jet printing head 1 are provided at least one pair of particle-collecting electrodes 10 and 10' to which a particle-collecting voltage Vc is applied with respect to the surface electrode 2. The application of the particle-collecting voltage Vc to the particle-collecting electrodes 10, 10' is controlled through a pair of switching devices 3 and 3' so that the switching device 3 assumes the closed state in response to the ink jet printing head 1 coming near the particle-collecting electrode 10 and the switching device 3' similarly assumes the closed state in response to the same coming in close to the particle-collecting electrode 10'. The control of the switching devices 3, 3' may be performed in accordance with signals from sensors (not shown) indicative of the positions of the ink jet printing head 1. On the surfaces of the particle-collecting electrodes 10, 10' facing to the ink jet printing head 1 are provided adhesion tapes 11, 11' with adhesive compound, the adhesion tapes being exchangeable.

In operation, since the bias voltage $V_B$ is always applied to the surface electrode 2 of the printing head 1, particles 29 on a surface of the writing paper 5 are charged negatively and drawn and attached to the surface electrode 2 in response to the movement of the printing head 1. As described above, the particle-collecting voltage Vc is applied to one of the particle-collection electrodes 10, 10' by means of the switching devices 3 or 3' when the printing head 1 passes the particle-collecting electrode 10 or 10'. The particle-collecting voltage Vc is set to be higher than that of the bias voltage $V_B$. Thus, in response to the passing thereof, the particles 29 attached to the surface electrode 2 are again drawn toward the particle-collecting electrode 10 or 10' and attached to the adhesion tape 11 or 11' so as to be inseparable. Preferably, the adhesion tapes 11 and 11' are encased in a cartridge 27 and arranged to be taken up in accordance with the movement of the printing head 1.

It should be understood that the foregoing relates to only the embodiments of the present invention, and that it is intended to cover all changes and modifications of the embodiments of the invention herein used for the purposes of the disclosure, which do not constitute departures from the spirit and scope of the invention.

What is claimed is:

1. An ink jet recording apparatus comprising:

printing head means including a head body, an ink chamber formed in said head body to have an ink nozzle, a first plate-like electrode plate disposed on a front surface portion of said head body having an ink ejecting opening, a second electrode disposed at said ink chamber, said first and second electrodes establishing an electric field therebetween in response to application of a voltage signal thereto to cause ink in said ink chamber to be pulled out from said ink nozzle and ejected through said ink jet opening;

holding means for holding writing paper and for moving said writing paper with respect to said printing head means, said holding means being provided so as to be in opposed relation to one surface of said first electrode of said printing head means to receive the ink ejected from said printing head means by said writing paper;

electrode means including at least a third electrode provided at the holding means; and control means for controlling a control voltage signal applied to said third electrode so that the potential of said third electrode is equal to or higher than that of said first electrode of the printing head means, whereby microscopic objects attached to said surface of said first electrode are removed therefrom toward said third electrode.

2. An ink jet recording apparatus as claimed in claim 1, wherein said holding means is a drum, a portion of which is made of a conductive material and is used as said third electrode.

3. An ink jet recording apparatus as claimed in claim 1, wherein said control means includes switching means coupled between said third electrode and a voltage source which is in turn coupled to said first electrode.

4. An ink jet recording apparatus as claimed in claim 1, wherein said third electrode is placed on the outer surface of said holding means.

5. An ink jet recording apparatus comprising:

printing head means including a head body, an ink chamber formed in said head body to have an ink nozzle, a first electrode disposed on a front surface portion of said head body, a second electrode disposed at said ink chamber, said first and second electrodes establishing an electric field therebetween in response to application of a voltage signal thereto to cause ink in said ink chamber to be ejected through said ink nozzle;

holding means for holding writing paper and for moving said writing paper with respect to said printing head means in the longitudinal direction thereof, said holding means being provided so as to be in opposed relation to said first electrode of said printing head means to receive the ink ejected from said printing head means by said writing paper;

moving means for moving said printing head means in the traversal directions of said writing paper in opposed relation to said writing paper; and electrode means including third and fourth electrodes provided at both sides of said holding means so that they face said printing head means when said printing head means is out of the writing position range and further including control means for controlling said third and fourth electrodes so that the potential values thereof are respectively higher than that of said first electrode of the printing head means.

6. An ink jet recording apparatus as claimed in claim 5, wherein said third and fourth electrodes have, at their front surfaces facing said printing head means, adhesive members, respectively.

7. An ink jet recording apparatus as claimed in claim 6, wherein said adhesive members comprise an adhesive tape, both the ends of which are wound around a supply reel and a take-up reel and which is taken up by a predetermined amount in accordance with the movement of said printing head means.

8. An ink jet recording apparatus as claimed in claim 5, wherein said control means controls said third and fourth electrodes so that one of said third and fourth electrodes is energized when being in opposed relation to said printing head means and the potential thereof is higher than that of the printing head means.

* * * * *